May 7, 1963     R. R. MYERS     3,088,761

COMPRESSIBLY DEFORMABLE CONNECTORS

Original Filed Feb. 23, 1960

INVENTOR.
Robert R. Myers
BY
ATTORNEY

United States Patent Office 3,088,761
Patented May 7, 1963

3,088,761
COMPRESSIBLY DEFORMABLE CONNECTORS
Robert R. Myers, Port Vue, McKeesport, Pa., assignor to Aluminum Company of America, Pittsburgh, Pa., a corporation of Pennsylvania
Continuation of application Ser. No. 10,490, Feb. 23, 1960. This application Apr. 25, 1962, Ser. No. 193,643
3 Claims. (Cl. 287—108)

This invention relates to compression type fittings for splicing or joining and/or attachment to elongate members, such as tubes, rods, cables, and the like. The invention is more specifically addressed to a two-element sleeve-type connector, or attaching accessory, capable of compressible assembly on the exposed surfaces of elongate members to repair fractures therein, splice or connect together axially aligned elongate members, and/or provide attaching means to elongate members on which the two-element sleeve has been compressibly assembled. This application is a continuation of my copending application Serial No. 10,490, filed February 23, 1960, now abandoned.

Devices of the invention have reached particular significance and adaptability in the electrical conductor field in the repair of partial and/or complete fracture of one or more of the individual strands of stranded conductors, and has also been employed successfully in splicing or joining together the ends of two separate lengths of axially aligned undamaged cable, as well as providing tap-off connections for cable drop-lines, and the like.

Although the invention is described in detail hereinafter in its application in connection with stranded conductors in the electrical transmission field, it will be understood by those versed in the art that the devices of the invention are in no way limited in their application to specific types of elongate members.

It is a prime object of the invention to provide a preformed two-element sleeve member capable of compressible engagement with the exterior surface of an elongate member in a manner to insure interengaged interlocking engagement between the normally separate elements of the sleeve, as well as compressible engagement of the assembled two-element sleeve on the exterior surface of the elongate member.

It is another object of the invention to provide a two-element connector or attachment sleeve for compressible application on elongate members, the elements of which are capable of fabrication as mass-produced, readily reproducible, economically priced, factory items.

Another object of the invention is to provide a preformed two-element repair sleeve for use in reinforcing and/or repairing partially or completely fractured elongate members through compressible deformation of the repair sleeve elements into interengagement between its elements and with the elongate members axially along the same in overlying relationship to the fracture therein.

A further object of the invention is to provide a sleeve-type connector comprising two axially slidable, interengaging elements, which on assembly and subsequent compressible deformation on an elongate member, produces interlocked keyed engagement of the two elements of the connector against outward separation under forces developed within the interior of the connector.

Other objects and advantages of the invention will be understood from the following description of the invention, on reference to the illustrations appended hereto, in which.

Figure 1:
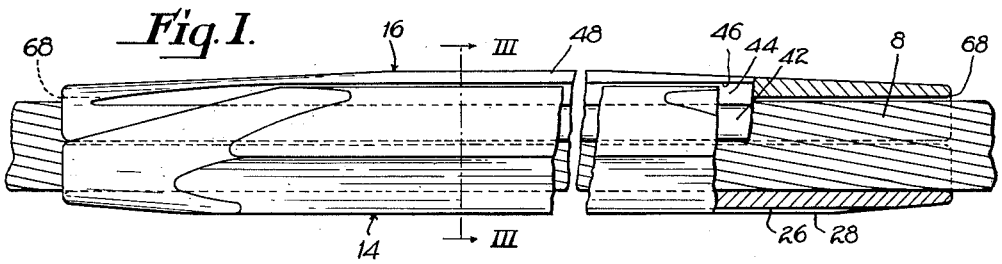
FIG. 1 represents a side elevational view, in partial section, of an assembled two-element connector of the invention in uncompressed condition.
Figure 2:
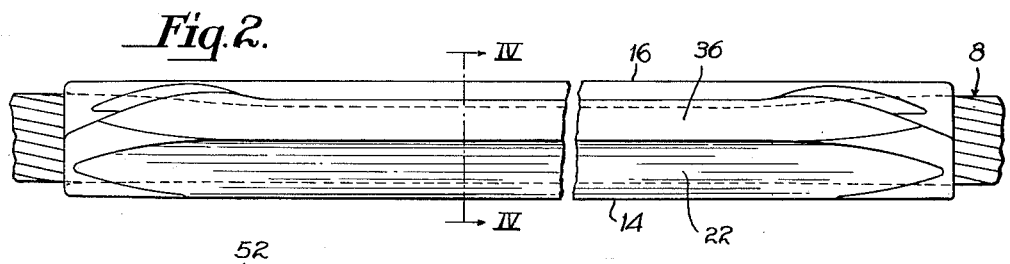
FIG. 2 represents a side elevational view of the assembled connector of FIG. 1 in compressed condition on an elongate member.

In general, devices falling within the scope of the invention pertain to connectors for attachment to elongate members, preferably characterized by substantially circular transverse cross-section, the connectors comprising two elements which are axially slidable in interengaging assembly around the exterior surface of one or more of the elongate members and thereafter deformably compressed into tight fitting interlocking relationship between the two elements of a connector, as well as in compressed tight engagement with the exposed surface of the elongate member or members supporting the same.

The elements of a connector of the invention are capable of fabrication in the form of castings, forgings, extrusions and/or rolled members and are preferably manufactured from materials which are plastically deformable beyond their elastic limits, under normal temperature conditions, in their attachment to the elongate members with which they are intended to be employed. When employed in attachment to electrical conductors, the connector elements are preferably fabricated from metals and/or metallic alloys of the same general character as the material of the conductors, aluminum and its alloys having been employed successfully in the mass production of connectors falling within the scope of the invention for repairing aluminum electrical transmission cables, attaching tap-lines thereto, and connecting or splicing adjacent axially aligned ends of two original aluminum cables.

Regardless of the manufacturing technique or practice employed in the fabrication of the connectors of the invention, plant fabricated extruded, forged and rolled connector elements permit of their production in relatively long lengths from which any desired length of the connector elements may be cut, sheared or otherwise severed to accommodate a variety of connector installations. Continuous casting techniques can also be employed in the fabrication of relatively long lengths of the connector elements from which desired individual lengths may be severed. Manifestly, the connector elements can be fabricated to desired final length by any one or a combination of the aforesaid practices.

A preferred embodiment of the invention, with specific reference to the appended illustrations, depicts a two-element connector of the invention before and after its attachment to an electrical transmission cable 8 comprising a central stranded steel core cable 10 and outer bare aluminum conductor strands 12, the connector thus illustrated comprising a body member or element 14 and a keeper or cap element 16.

The body member 14 is of generally U-shaped cross-section with the web 18 thereof providing an interior transverse surface 20 substantially complementary to a substantially equal transverse perimetrical length of the exterior surface defining the periphery of the outer layer of conductor strands 12 of the composite cable 8 to be received therein, which in the present instance constitutes substantially half the outer circumference of the cable 8. The exterior surface of the web 18, on the other hand, is preferably configurated or defined by two inclined lateral flat plane surfaces 22 and 24 and an intermediate connecting curvilinear surface constituting a generally three-sided or substantially half hexagon outline symmetrically disposed in respect of the interior surface 20 of the web 18.

Figures 3, 4:
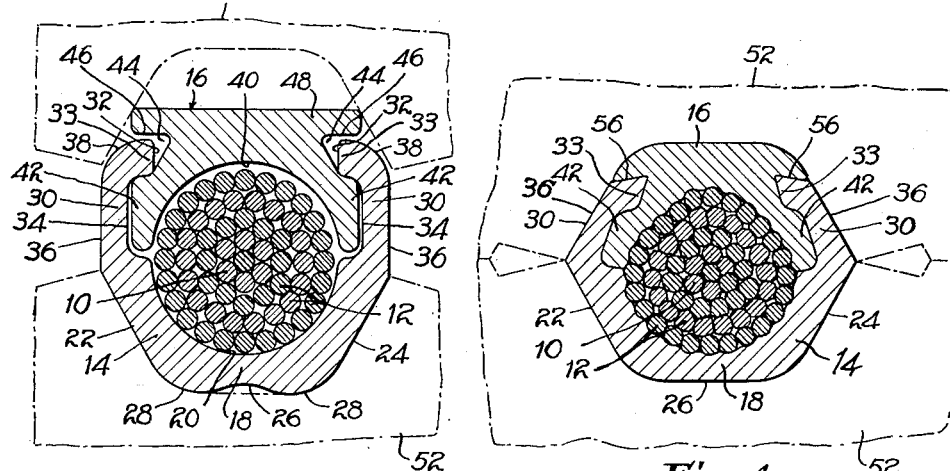
FIG. 3 represents a transverse sectional view taken on the plane III—III of FIG. 1.
FIG. 4 represents a transverse sectional view taken on the plane IV—IV of FIG. 2.

It will be observed, on reference to FIG. 3, that the connecting curvilinear surface 26 is centrally depressed in respect of the interior surface 20 to thereby reduce the thickness of web 18, and that maximum thicknesses of web 18 are disposed in the areas 28 of contiguous juncture between the two inclined flat lateral surfaces 22 and 24 with the intermediate curvilinear surface 26.

Integral flanges 30 extend outwardly away from the web 18 of the generally U-shaped body member 14 of the connector. In the particular embodiment of connector selected for attachment to a generally cylindrical elongate member, such as the transmission cable 8, the oppositely disposed inner faces or surfaces of the flanges 30 preferably lie in planes tangential to the semi-circular surface 20 of the web 18 to provide oppositely disposed substantially flat parallel surfaces 32 of inwardly directed tongues 33 adjacent the free ends of the flanges 30. Contiguous with the flat surfaces 32 and the interior surface 20 are oppositely disposed outwardly depressed grooves 34.

The outer surfaces of the flanges 30 are preferably defined by oppositely disposed parallel flat surfaces 36, contiguous respectively with one of each of the outer lateral inclined flat surfaces 22 and 24 of the web 18, which preferably terminate in arched surfaces 38 to complete the aforementioned inwardly directed tongues 33.

The keeper or cap member 16 is designed and constructed for axial sliding interengagement within the body member 14 and is preferably substantially equal in axial length thereto. It will be observed on reference to FIG. 3 that the cap 16 is provided with a configurated surface 40 substantially complementary to the remaining exterior surface of the elongate member receivable within the body member 14 out of contact with the surface 20 thereof. In the selected embodiment the surface 40 is also substantially semi-circular.

Oppositely disposed exterior or outer side walls of the cap 16 are configurated to provide oppositely disposed laterally outwardly extending flanges or tongues 42 and preferably generally angularly shaped inwardly depressed contiguous notches or grooves 44 immediately above the tongues 42, the grooves 44 terminating in relatively flat surfaces 46 constituting a generally T-shaped head 48.

In application of the two-element connector above-described, the body member 14 is first placed in embracing relationship of its interior surface 20 in contact with a substantially equivalent contiguous perimetrical length of substantially complementary exposed surface of the cable 8. The keeper member 16 is thereafter assembled within the body member 14 through axial relatively sliding engagement of the cap and body members to interengagingly register the flanges 42 and notches 44, on the lateral exterior surfaces of the keeper, with the interior grooves 34 and inwardly extending tongues 33 of the body member, respectively. As best illustrated in FIG. 3, initial assembled registration of the keeper 16 and body member 14 of a connector is accomplished by providing clearance relationship between the cap and body elements in respect of their aforesaid interengaging groove and tongue or flange configurations, which insures initial clearance between the exposed surface of the elongate member supporting the same and the interior surfaces 20 and 40 of the body and keeper members to permit axial relative movement therebetween.

The intially assembled keeper and body elements (FIG. 3) are deformably compressed beyond the elastic limits of the materials from which they have been fabricated within a pair of relatively movable opposed die blocks 52 selected in their cross-sectional configuration to insure plastic deformation of the cap and body members into tightly compressed interengagement of their interlocking elements, as well as into compressed engagement with the exposed surface of the elongate member or members supporting the same (FIG. 4).

In the embodiment selected for illustration purposes, the dies 52 preferably form a substantially true hexagon-shaped material working orifice therebetween, which accounts for the original selection of the exterior polygonally-shaped outline of the web 18 of the body element of the connector. In this connection, the depressed central area of the curvilinear surface 26 of the body member 14 and its relationship within the hexagon-shaped dies 52, insures displacement and directional flow of the material of the body and keeper elements 14 and 16, respectively, to substantially completely fill the hexagon-shaped die working orifice formed between the dies 52.

It will be observed on reference to FIG. 4 that plastic deformation of the two-element connector of the invention results in considerably more flow and redistribution of the material of the initial cap or keeper 16 and initially parallel flanges 30 of the body 14 immediately adjacent thereto in the area of the compressed connector above a transverse horizontal plane through the center of the cable 8, or in the area immediately below the head flange 48 of the keeper 16. The redistribution of the material of the keeper or cap 16 and body member 14 in the aforesaid area results in vertical and lateral keyed interconnection between body 14 and keeper 16, the laterally inwardly projecting tongues or flanges 33 of the body member being displaced inwardly within the angularly-shaped grooves 44 of the keeper to provide substantially wedge-shaped inwardly and upwardly inclined engaging or keying surfaces 56, which not only serve to restrain lateral separation of the compressed and deformed keeper and body member of the connector, but also combine with the tongues 42 within the grooves 34 to resist vertical separation of the compressed and plastically deformed body and keeper elements, a condition which can arise and prevail, as a result of thermal expansion of an electrical conductor under electrical loading, to develop an outwardly exerted radially applied separation pressure on the connector elements.

On comparison of the uncompressed connector (FIG. 3) of the invention, with the connector in its compressed condition (FIG. 4), it will be observed that there is an excess of material of the connector above the horizontal transverse central plane facing the T-shaped head 48 of the keeper 16 than below this transverse plane. This unequal distribution of the material of the keeper and body elements insures considerably more displacement of the material of the keeper and body elements in the immediate areas of their interengaging tongues and grooves and provides their being plastically deformed under external pressure between the dies 52 in a manner to develop the aforementioned unitary, keyed, interengaged assembly. Initial disposition of the excess material and volume of the connector comprising the keeper 16 in its entirety, together with extending flanges 30 of body member 14 above the aforesaid central transverse horizontal plane, as viewed in FIG. 3, also results under the compressive affixation of the connector between the similar die blocks 52 in transforming the initial transverse outline of the elongate member 8 from generally circular to one of generally triangular outline above a central horizontal plane bisecting the exteriorly symmetrically compressed and affixed connector (FIG. 4).

Figure 5:
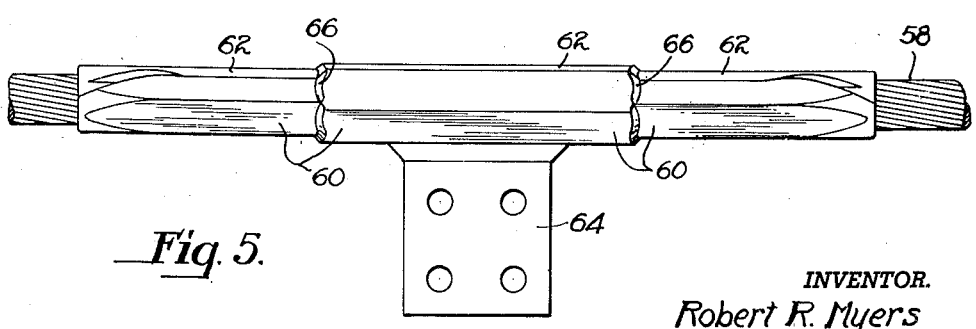
FIG. 5 represents a side elevational view of a connector of the invention in its application as a drop-line accessory attaching fitting.

FIG. 5 illustrates a two-element sleeve-type connector of the invention in compressibly deformed assembly on an electrical transmission cable 58 to provide a drop-line or similar attaching fitting. Therein the body element 60 and keeper 62 are identical with their previously described corresponding elements 14 and 16, respectively, the body member 60 in this instance being provided with a centrally depending lug or web 64, as by welded connection therebetween, to which a drop-line or similar auxiliary cable may be suitably connected. Plastic deformation of the connector in this instance is avoided in the central axial length of the same adjacent the depending web 64, as indicated by the shoulders 66.

The interlocking body and keeper elements of connectors of the invention have been found in performance tests to develop the full strength of elongate members with which they been employed, and in the case of electrical conductors, have resulted in providing sound cable joints, drop-line attachments, and have repaired fractures, in the absence of appreciable temperature rise because of increased electrical resistance.

The keeper and body elements are preferably axially tapered for a short distance from each end of the assembled uncompressed two-element connectors (FIG. 1) and are provided with bell-mouth configurated terminal entrances 68. This construction is desirable and is controlling, under compressive deformation of the two-element connectors on their supporting elongate members, to provide a degree of flexibility and relieve undue abrupt compressive stresses and stress raisers in the elongate members immediately adjacent the ends of the connectors.

Although the connectors of the invention have been described and illustrated with reference to a polygonally-shaped, and specifically a substantially hexagon-shaped, exterior configuration after plastic deformation on the elongate member supporting the same, it will be understood that the interengaging keeper and body elements may be otherwise configured by initial selection of the external surface of the web of the generally U-shaped body element and die halves substantially complementary thereto. For example, a pair of die halves configurated to provide an ovoid material working orifice would be employed to compressibly deform a connector the body element of which differed from that illustrated and described hereinabove only in respect of its exterior web surface, which would preferably be selected in the form of an elliptical or oval surface substantially complementary to the interior ovoid surface of a die half receiving the same.

What is claimed is:

1. In a two-element connector for plastic deformable compressive interengagement and attachment on the exposed surface of an elongate member, said connector comprising a body member of initially generally U-shaped transverse cross-section and a keeper of initially generally T-shaped transverse cross-section, said body member having a bottom web interiorly recessed substantially complementary to one half the exposed transverse circumference of the elongate member with parallel flanges extending outwardly from the bottom web normal to a horizontal transverse plane coincident with the entrance diameter to the interior recessed web, an exterior bottom web surface contiguous with the flanges comprising downwardly converging similar lateral surfaces connected by a transverse contiguous inwardly depressed reverse curvilinear bottom surface, said keeper having a substantially horizontal top head flange and depending central web the bottom surface of which is recessed substantially complementary to the remaining one half exposed transverse circumference of the elongate member, opposite facing surfaces of the parallel spaced flanges of the body member and opposite lateral side surfaces of the depending central web of the keeper being complementarily configurated for interengaging interlocking tongue and groove axial sliding assembly of the initial keeper between the parallel spaced flanges of the initial body member with the keeper disposed entirely to one side of the transverse plane coincident with the entrance diameter to the interior recessed bottom web of the body member to thereby provide an excess of material comprising the interengaged keeper and parallel spaced body flanges on the keeper side of said transverse plane in circumferentially encircling and enclosing relationship of the elongate member within the assembled keeper and body member, and said initially assembled keeper and body member being capable of and responsive to exteriorly applied and confining pressure to symmetrically duplicate the exterior defining configuration of the compressed assembled connector on both sides of a transverse plane parallel to the transverse plane of initial assembly of the connector and bisecting the compressed and affixed connector with accompanying maximum plastic deformation and redistribution of the excess material of the connector and underlying elongate member on the keeper side of said last-mentioned transverse plane, said symmetrically deformed connector on compressed affixation providing an exterior configuration of substantially the exterior bottom web surface outline defined by the opposite lateral downwardly converging exterior surfaces of the initial body member and redistributed material of the bottom web filling out the initially depressed reverse curvilienear bottom surface of the web.

2. In a two-element connector capable of plastic deformable compressive interlocking intergagement and attachment on the exposed surface of an elongate member, said connector comprising a body member of initially generally U-shaped transverse cross-section and a keeper of initially generally T-shaped transverse cross-section, said body member having a bottom web defining an interiorly recessed surface substantially complementary to one half the exposed transverse circumference of the elongate member and an exterior surface defined by downwardly converging oppositely inclined lateral surfaces connected by a transverse continguous inwardly depressed reversely curved bottom surface, integral parallel spaced flanges one each extending away from the bottom web normal to a horizontal plane coincident with the entrance diameter to the interior recessed web surface, said keeper having a top head flange and depending central web the bottom surface of which is recessed substantially complementary to the remaining one half exposed transverse circumference of the elongate member, opposite facing surfaces of the parallel spaced flanges of the body member and opposite lateral side surfaces of the depending central web of the keeper being complementarily configurated for interengaging interlocking tongue and groove axial sliding assembly of the initial keeper between the parallel spaced flanges of the initial body member with the keeper disposed entirely to one side of the transverse plane coincident with the entrance diameter to the interior recessed bottom web of the body member to thereby provide an excess of material comprising the interengaged keeper and parallel spaced body flanges on the keeper side of said transverse plane in circumferentially encircling and enclosing relationship of the elongate member within the assembled keeper and body member, and said initially assembled keeper and body member being capable of and responding to exteriorly applied and confining pressure between similar and opposing exterior configuration-controlling working surfaces to duplicate the exterior defining configuration of the compressed assembled connector on both sides of a transverse plane parallel to the transverse plane of initial assembly of the connector and bisecting the exterior configuration of the compressed and affixed connector with accompanying maximum plastic deformation and redistribution of the excess material of the connector and underlying elongate member on the keeper side of said last-mentioned transverse plane, said connector following its compressive affixation exhibiting bottom exterior web surfaces complementary to the downwardly converging oppositely inclined lateral surfaces of the bottom web of the initial body member and a contiguous connecting outwardly redistributed and disposed substantially flat bottom exposed web surface.

3. In a two-element connector capable of deformable compressive interlocking interengagement and attachment on the exposed surface of an elongate member to provide a substantially hexagon-shaped exterior configuration of the affixed connector, said connector comprising a body member of initially generally U-shaped transverse cross-section, said body member having a bottom web defined by an interior surface recessed substantially complementary to one half of the exposed transverse circumference of the elongate member and an exterior surface symmetrically disposed to the interior recessed surface substantially complementary to one half of the hexagon-shaped exterior configuration of the compressibly deformed and attached connector, parallel spaced flanges extending away from the bottom web of the body member normal to the entrance diameter to the interior recessed bottom web surface, said parallel spaced flanges each having an inwardly turned tongue at its free extremity, said keeper having a top head flange and depending central web the bottom surface of which is recessed substantially complementary to the remaining one half exposed transverse circumference of the elongate member, opposite lateral side surfaces of the central web being recessed below the head of the keeper to axially slidingly receive the inwardly turned tongues of the body member flanges in encircling and enclosing axial sliding assembly of the keeper and body member around the elongate member, said parallel body flanges and slidingly interengaged keeper in their initial form on the elongate member disposing the keeper in its entirety on one side of the transverse plane coincident with the entrance diameter to the interior recess in the bottom web of the body member and representing an excess of the material of the connector comprising the entire keeper and interengaged adjacent portions of the parallel spaced body member flanges, and said initially assembled connector on the elongate member being responsive to exteriorly applied and confining pressure to substantially duplicate the configuration of the exterior surface of the bottom web of the initial body member in superimposed relationship thereto with maximum resultant deformation and compressive plastic flow and redistribution of the excess material of the keeper in interengaged compressive interlocking assembly with the body member and plastically deformed elongate member underlying the same.

References Cited in the file of this patent

UNITED STATES PATENTS

| | | |
|---|---|---|
| 2,521,192 | Tessmann | Sept. 5, 1950 |
| 2,759,256 | Bergan | Aug. 21, 1956 |
| 2,895,195 | Ehmann | July 21, 1959 |
| 2,995,615 | Gibbon | Aug. 8, 1961 |

FOREIGN PATENTS

| | | |
|---|---|---|
| 667,027 | Germany | Nov. 3, 1938 |